United States Patent [19]

Brauer

[11] Patent Number: 5,248,939

[45] Date of Patent: Sep. 28, 1993

[54] APPARATUS FOR SENSING THE DIRECTION AND SPEED OF A STEERING WHEEL SHAFT USING HALL EFFECT SENSORS IN A DETACHABLE SENSOR MOUNTING

[75] Inventor: Michael C. Brauer, Goshen, Conn.

[73] Assignee: The Torrington Company, Torrington, Conn.

[21] Appl. No.: 483,116

[22] Filed: Feb. 22, 1990

[51] Int. Cl.$^5$ .................. G01P 3/48; G01P 3/54; G01B 7/14; G08B 21/00
[52] U.S. Cl. .................. 324/174; 324/207.2; 324/207.25; 340/672
[58] Field of Search ............ 324/173, 174, 207.2, 324/207.23, 207.25; 338/32 H; 340/672

[56] References Cited

U.S. PATENT DOCUMENTS

| | | | |
|---|---|---|---|
| 4,029,180 | 6/1977 | Gee | 188/181 R |
| 4,110,676 | 8/1978 | Edick et al. | 324/174 |
| 4,319,188 | 3/1982 | Ito et al. | 324/173 |
| 4,364,011 | 12/1982 | Bloomfield et al. | 324/174 |
| 4,415,054 | 11/1983 | Drutchas | 180/79.1 |
| 4,550,597 | 11/1985 | Drutchas et al. | 324/207.20 |
| 4,681,182 | 7/1987 | Susuki et al. | 180/79.1 |
| 4,836,578 | 6/1989 | Soltis | 324/207.24 |

FOREIGN PATENT DOCUMENTS 0030712 2/1986 Japan ................... 340/672

Primary Examiner—Walter E. Snow
Attorney, Agent, or Firm—John C. Bigler

[57] ABSTRACT

A bearing on a steering shaft has an elongated inner race and an elongated outer race with rolling elements between the two races. The inner race is rotatable with respect to the outer race. An encoder is mounted on the inner race. Sensors in a detachable sensor mount sense the radial magnetic field from the encoder as it rotates past the sensors.

8 Claims, 2 Drawing Sheets

APPARATUS FOR SENSING THE DIRECTION AND SPEED OF A STEERING WHEEL SHAFT USING HALL EFFECT SENSORS IN A DETACHABLE SENSOR MOUNTING

BACKGROUND OF THE INVENTION

The present invention provides a novel means for sensing the speed, direction and angular position of a vehicle steering shaft or column using a detachable or "clip-on" sensor mount containing multiple Hall-effect sensor elements.

Electronic control units (ECU) amass information from sensors and command the action of many vital functions in today's automobile. There are four major categories in which electronic controls have made substantial inroads: (1) engine, (2) transmission, (3) suspension, and (4) anti-lock braking/traction control. In all of these cases the signals of the rotational motion or position change of components are fed to the ECU, which compares them to a calculated or mapped value ideal for the operational conditions. The ECU then initiates changes in the controlled function in order to minimize deviation from ideal conditions. For this scheme to work effectively, high reliability, good resolution and economic sensor systems are required.

In order to sense motion/position in an automobile, there are four distinct systems that have evolved: (1) passive or variable reluctance sensors, (2) active sensors, such as Hall-effect sensors, (3) optical sensors, and (4) accelerometers. Variable reluctance sensors have been used predominantly in anti-lock braking systems (ABS) for wheel speed sensing and in automatic transmission output speed sensing. Hall-effect sensors have been used mostly in ignition systems, while optical sensors and accelerometers are used in suspension control systems.

Some of the major improvements in passenger comfort have been achieved as a result of improving the ride characteristics of automobiles. The improvements have been accomplished by, among other things, the introduction of active and semiactive suspension systems. Conventional systems sense lateral acceleration which is input into the ride control ECU. There are several ways of obtaining lateral acceleration. One popular way is to use steering column or shaft rotational position information (steering wheel angle) and the vehicle speed for calculating the resulting acceleration.

The need for sensing the position of automobile steering columns or shafts has developed because of active suspension systems, electronic power steering assistance, safe driver warning systems, and four wheel steering. As such, various sensors have been created to detect speed, direction and a reference pulse (i.e., true position). The conventional means for obtaining steering wheel angle information is an optical sensor system or an accelerometer.

The present invention relates primarily to the use of Hall-effect sensors to detect the speed, direction and position of an automobile steering column or shaft. The sensor bearing according to the present invention utilizes the precision of existing steering shaft support bearings. Other advantages involve weight and cost savings, insensitivity to dirt or foreign matter, simple mounting, high resolution, and an easy way to achieve a true reference position.

Moreover, the present invention provides a much more simplified design verses conventional optical sensors with the added benefits of "clip-on" sensor mounting, directional sensing and reference pulse recognition.

Additional advantages of the present invention shall become apparent as described below.

SUMMARY OF THE INVENTION

Briefly described, the apparatus for sensing the direction and speed of a steering shaft comprises a steering shaft support bearing having an elongated inner race, an elongated outer race and rolling elements disposed therebetween. The inner race is rotatable with respect to the outer race. An encoder is mounted on the inner race. A detachable sensor mount is affixed to the outer race of the steering shaft support bearing. A first sensor and a second sensor are positioned in the sensor mount to sense the radial magnetic field from the encoder.

The invention as well as its many advantages may be further understood by reference to the following detailed description and drawings in which like parts have been given like numbers.

DETAILED DESCRIPTION

Figure 1:
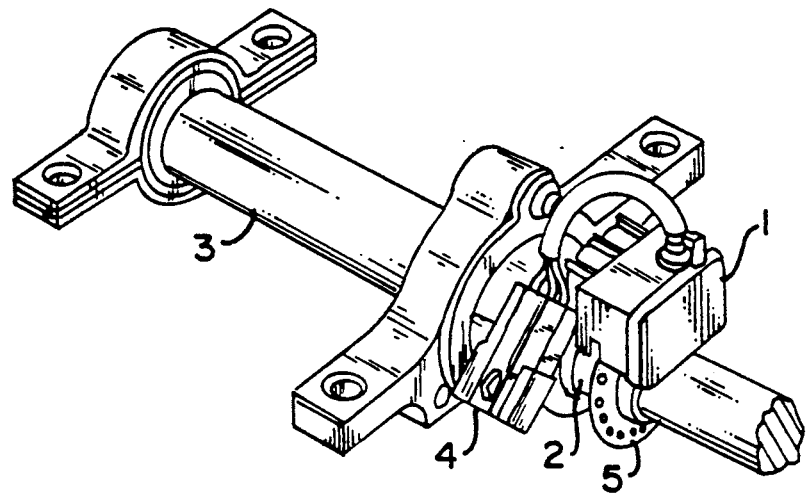
FIG. 1 is a perspective view of a conventional optical sensor disposed about a steering shaft or column.

A typical optical sensor system is shown in FIG. 1 wherein an optical sensor housing 1 is connected to steering shaft support bearing 2. Bearing 2 is mounted on steering shaft or column 3. Optical sensor housing 1 is powered by the adjacent electrical pin connector 4. The speed and direction of steering shaft 3 are attained by using quadrature of two sets of transmit and receive sensors (not shown) contained within optical sensor housing 1. The quadrature of the sensors is obtained through the geometry of slotted disk 5.

As can be seen from FIG. 1, there is considerable "territory" required in the steering shaft to accommodate an optical sensor system. Other disadvantages of using an optical sensor about a steering shaft is the relative cost, weight, and service. A service complication arises because a separate bearing has to be placed over the shaft. Maintenance of optical sensors is a particular problem, since optical sensors require a clean environment not found in the inherently dirty environment of an automobile. Furthermore, it is uncertain whether optical systems are capable of detecting true position of a steering wheel shaft.

The sensor bearing in accordance with the present invention involves redesigning of a steering support shaft bearing by extending the inner and outer races thereof. The inner or rotating member of the bearing is extended to accept an encoder, i.e., a multipole magnet ring. The outer or stationary member of the bearing is extended to permit the affixing or clipping-on of a sensor mount and a protective shield to the outer race.

The unique detachable or "clip-on" sensor mount contains a first sensor and a second sensor, i.e., Hall-effect sensors. The sensors are positioned opposite the multipole magnet ring in order to detect the radial magnetic field of the ring. They are arranged in such a way that their output signals are out-of-phase, i.e., the output signal of one sensor is 90° from the output signal of the other sensor. By electronically monitoring the relative position of the two output signals, directional information can be deduced.

The Hall-effect sensors are contained within a sensor mount. A multipole magnet ring is mounted on the inner race of a steering shaft support bearing. When the multipole magnet ring rotates relative to the Hall-effect sensors, a control signal is created which is delivered to an electronic control unit. The control signal indicates the relative speed of the steering wheel shaft. By using two Hall-effect sensors circumferentially spaced apart so as to generate control signals which are out-of-phase with each other, the direction of the steering shaft can be detected.

A third Hall-effect sensor can be integrated with the "clip-on" sensor mount if a reference pulse is desired. In that case, a single pole magnet is disposed in a magnet carrier. The magnet carrier is adjustably connected to the elongated inner or rotating race. For reference pulse positioning, a tab disposed on the magnet carrier fits within a slot in the steering shaft to establish an absolute or true reference pulse. Moreover, the circumferential position of the sensor mount assembly about the steering wheel shaft is assured by "interlocking" fork portions of the sensor mount with a shaft mounting bracket.

Figure 2:
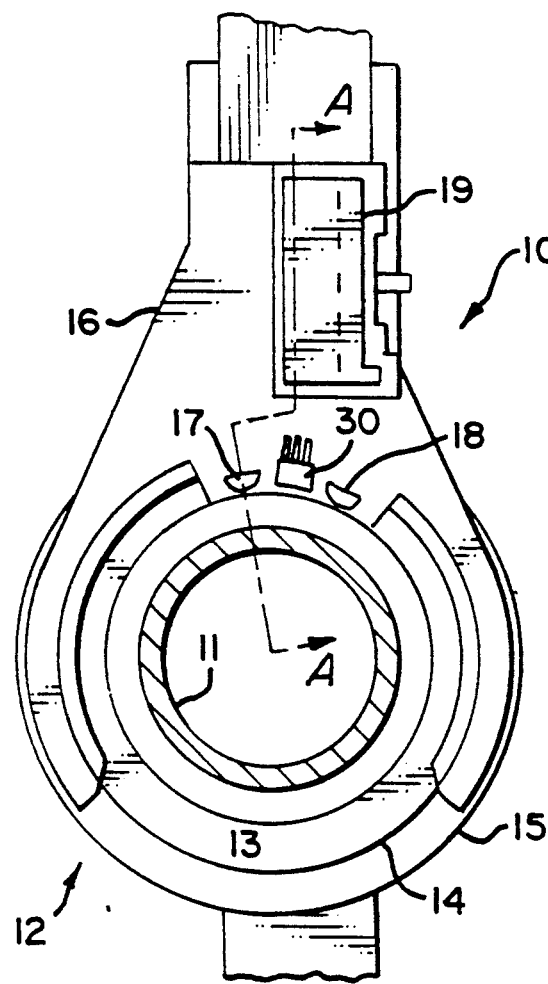
FIG. 2 is a front elevational view of a steering shaft bearing having, a detachable sensor mount in accordance with the present invention.
Figure 3:
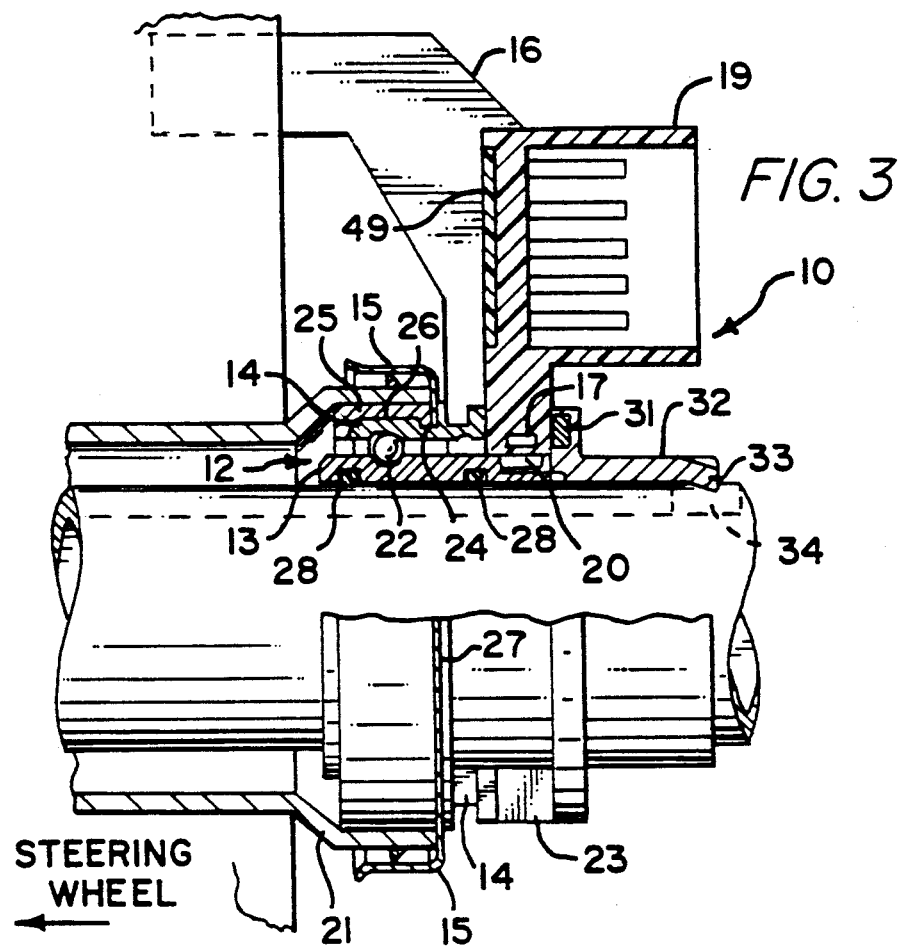
FIG. 3 is a side view and sectioned along line A—A of FIG. 2.

The invention can best be described by referring to the attached drawings wherein FIGS. 2 and 3 depict a bearing sensor assembly 10 which is used primarily for sensing the direction and speed of a steering shaft 11. Bearing sensor assembly 10 comprises a steering shaft support bearing 12 having an elongated inner race 13, an elongated outer race 14 and rolling elements 22 disposed therebetween. Inner race 13 is retained about steering shaft 11 via O-rings 28. The outer race 14 is provided with an annular groove 24. The outer race is kept in the proper axial position with respect to the column bearing housing 21 by annular member 25 which has an axial portion of greater diameter than the rest of annular member 25 which encompasses the portion 26 of outer race 14. A bearing clip 15 has a radially extending portion 27 which fits between annular member 25 and a shoulder on outer race 14 formed by the annular groove 24. Thus, the outer race is properly located within steering shaft bearing housing 21. Inner race 13 is relatively rotatable with respect to outer race 14.

An encoder 20 is mounted on inner race 13 of steering shaft support bearing 12 and a detachable sensor mount 16 is affixed to outer race 14. Sensor mount 16 has a first sensor 17 and a second sensor 18 positioned opposite encoder 20 such that first sensor 17 and second sensor 18 can detect a radial magnetic field generated by encoder 20. Sensors 17 and 18 are preferably Hall-effect detectors.

Sensors 17 and 18 are contained within sensor mount 16 in such a manner that the output signal of one sensor is out-of-phase with the output signal of the other sensor. Above the sensors (17,18) is an electrical or integral connector 19. Connector 19 is an integral part of sensor assembly 10 and is of the same material as sensor mount 16. Sensor mount 16 may also contain a circuit board 49 and any other desirable components. The sensors (17,18) and electrical connector pins are typically soldered to a circuit board which is inserted into a pre-moulded plastic sensor mount 16. Thereafter potting material is used to fill in behind the sensors (17,18) and through the circuit board.

Encoder 20 is preferably a multipole magnet ring having a plurality of permanently magnetized magnetic pole segments. Each magnetic pole segment has a North pole and a South pole, with the segments being arranged so that each pole is between two poles of opposite polarity.

A protective shield 23 is disposed about steering shaft support bearing 12 to protect encoder 20 from loose magnetic particles, such as nuts and bolts. Protective shield 23 will inhibit any large magnetic particles from sticking to encoder 20 and potentially stopping the rotation of the steering wheel (not shown). Protective shield 23 is connected to outer race 14 and includes an opening such that the sensors (17,18) may be positioned directly opposite encoder 20. Protective shield 23 is formed of any suitable plastic.

Optionally, a third sensor 30 is disposed on sensor mount 16 orthogonal to first sensor 17 and second sensor 18, and a reference pulse magnet 31 is disposed within an annular magnet carrier 32 in such a manner as not to effect the output of encoder 20. Reference pulse magnet 31 is a single pole magnet.

Magnet carrier 32 also includes a means for maintaining a predetermined circumferential positioning of reference pulse magnet 31 about steering shaft 11. The means for maintaining a predetermined circumferential positioning is tab 33 located at the free end of magnet carrier 32 and fits into a slot 34 disposed in steering shaft 11.

Figure 4:
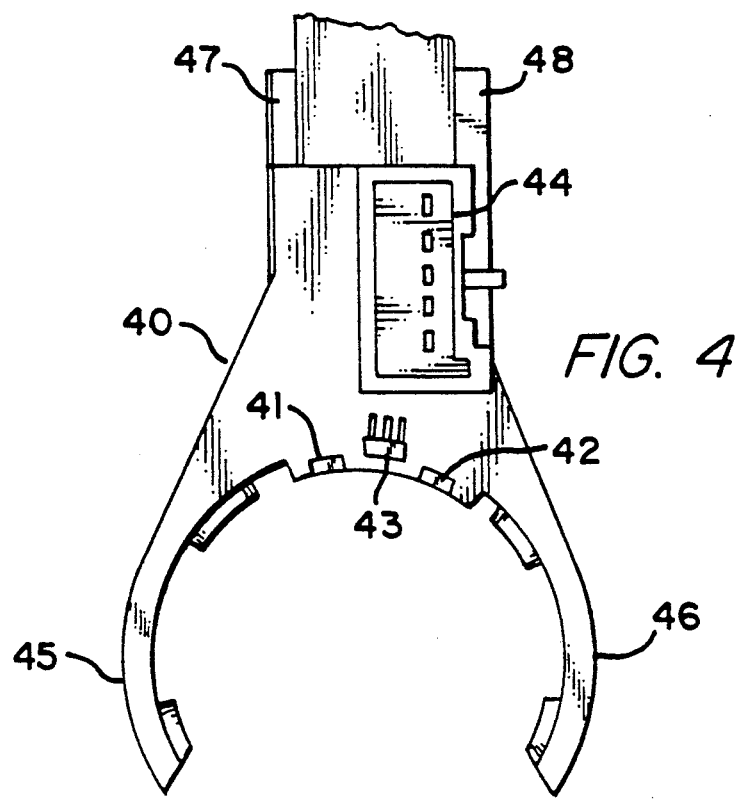
FIG. 4 is a front view of a sensor mount in accordance with the present invention.

FIG. 4 depicts a preferred embodiment of a sensor mount 40 having a first sensor 41, a second sensor 42, a third sensor 43 and electrical or integral connector 44. Sensor mount 40 is formed of plastic and includes a pair of flexible fingers 45 and 46. Flexible fingers 45 and 46 are placed about an outer portion of a steering shaft (not shown) and extend almost all the way around the shaft. Flexible fingers 45 and 46 act to pull the sensors (41, 42 and 43) up to the bearing outer diameter and to properly position the sensors opposite the appropriate encoder.

The design of detachable sensor mount 40 enables easy assembly and disassembly of the sensor system without removing any parts over the steering shaft. Therefore, servicing of this sensor system is very simple, especially in the event when a sensor requires replacement.

The circumferential position of sensor mount 40 is assured by "interlocking" the fork portions 47 and 48 of sensor mount 40 with a shaft mounting bracket (not shown).

While I have shown and described several embodiments in accordance with my invention, it is to clearly understood that the same are susceptible to numerous changes and modifications apparent to one skilled in the art. Therefore, I do not wish to be limited to the details shown and described but intend to show all changes and modifications which come within the scope of the appended claims.

Having described the invention, what is claimed is:

1. An apparatus for sensing the direction and speed of a steering shaft comprising:
   a steering shaft support bearing having an elongated inner race, an elongated outer race and rolling elements disposed therebetween, said inner race being rotatable with respect to said outer race;
   an encoder mounted on said inner race;

a sensor mount affixed to said outer race of said steering shaft support bearing;

a first sensor and a second sensor in the sensor mount, said sensors being positioned to sense a magnetic field generated by said encoder as it rotates past the sensors;

a third sensor positioned in said sensor mount orthogonal to said first and second sensors; and a reference pulse magnet positioned within a carrier in such a manner as not to affect the output of said first and second sensors, whereby a reference pulse is sensed by said third sensor as said reference pulse magnet passes.

2. The apparatus according to claim 1 wherein said reference pulse magnet is a single pole magnet.

3. The apparatus according to claim 1 wherein said carrier includes a means for maintaining a predetermined circumferential positioning of said reference pulse magnet on said steering shaft.

4. The apparatus according to claim 3 wherein said means for maintaining a predetermined circumferential positioning is a tab which fits into a slot in said steering shaft.

5. The apparatus according to claim 1 wherein the sensors are Hall-effect sensors.

6. The apparatus according to claim 1 wherein said encoder is a multipole magnet ring having a plurality of permanently magnetized magnetic pole segments.

7. The apparatus according to claim 1 wherein said first and second sensors are positioned in said sensor mount in such a manner that the output signal of one sensor is out-of-phase with the output signal of the other sensor.

8. The apparatus according to claim 1 wherein said sensor mount is capable of retaining said steering shaft support bearing whereby the use of a separate retaining spring is eliminated.

* * * * *